Jan. 9, 1968
A. E. NEUMANN
3,362,103
ANIMATED TOY CLOCK
Filed June 1, 1965
4 Sheets-Sheet 1
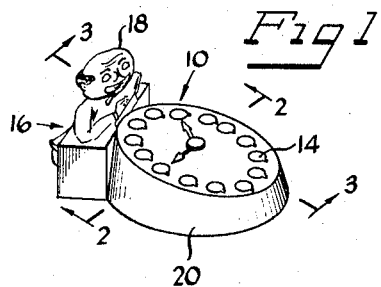
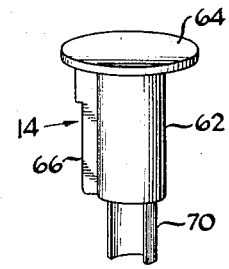
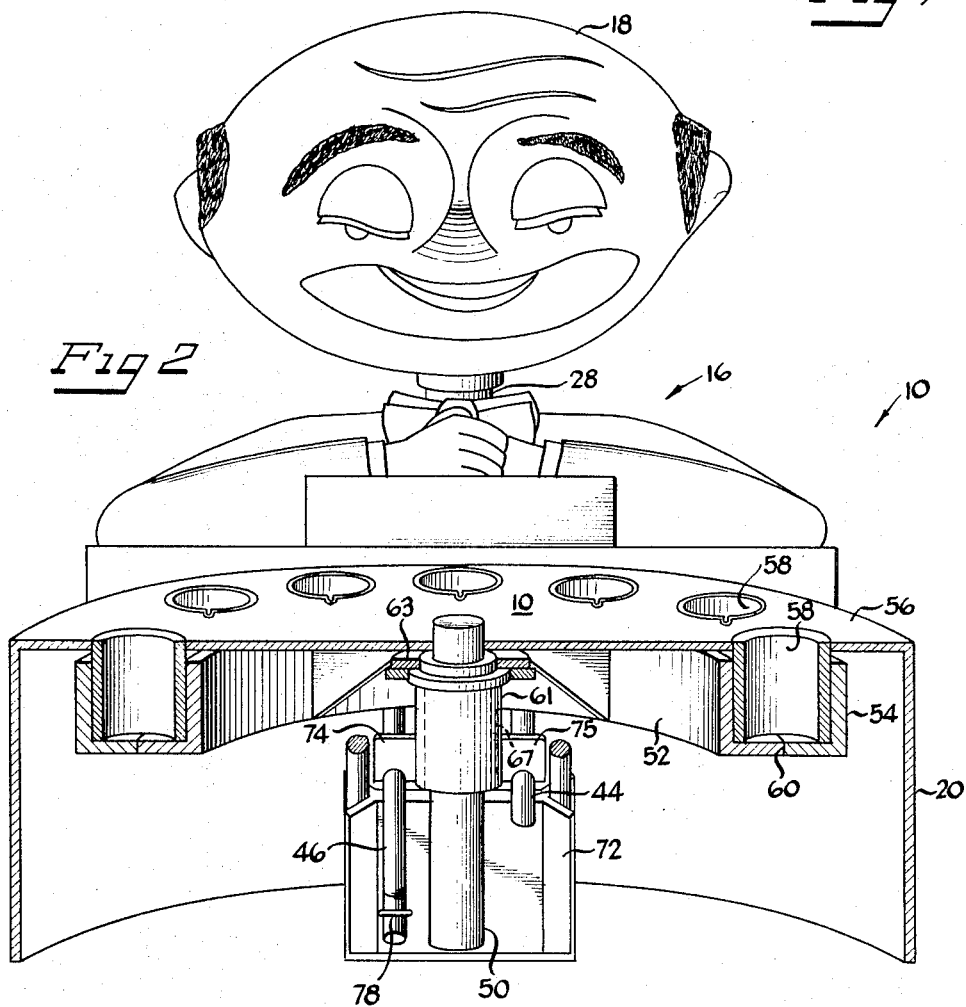
Inventor
Arthur E. Neumann
By Lucas & Coffee
Attys

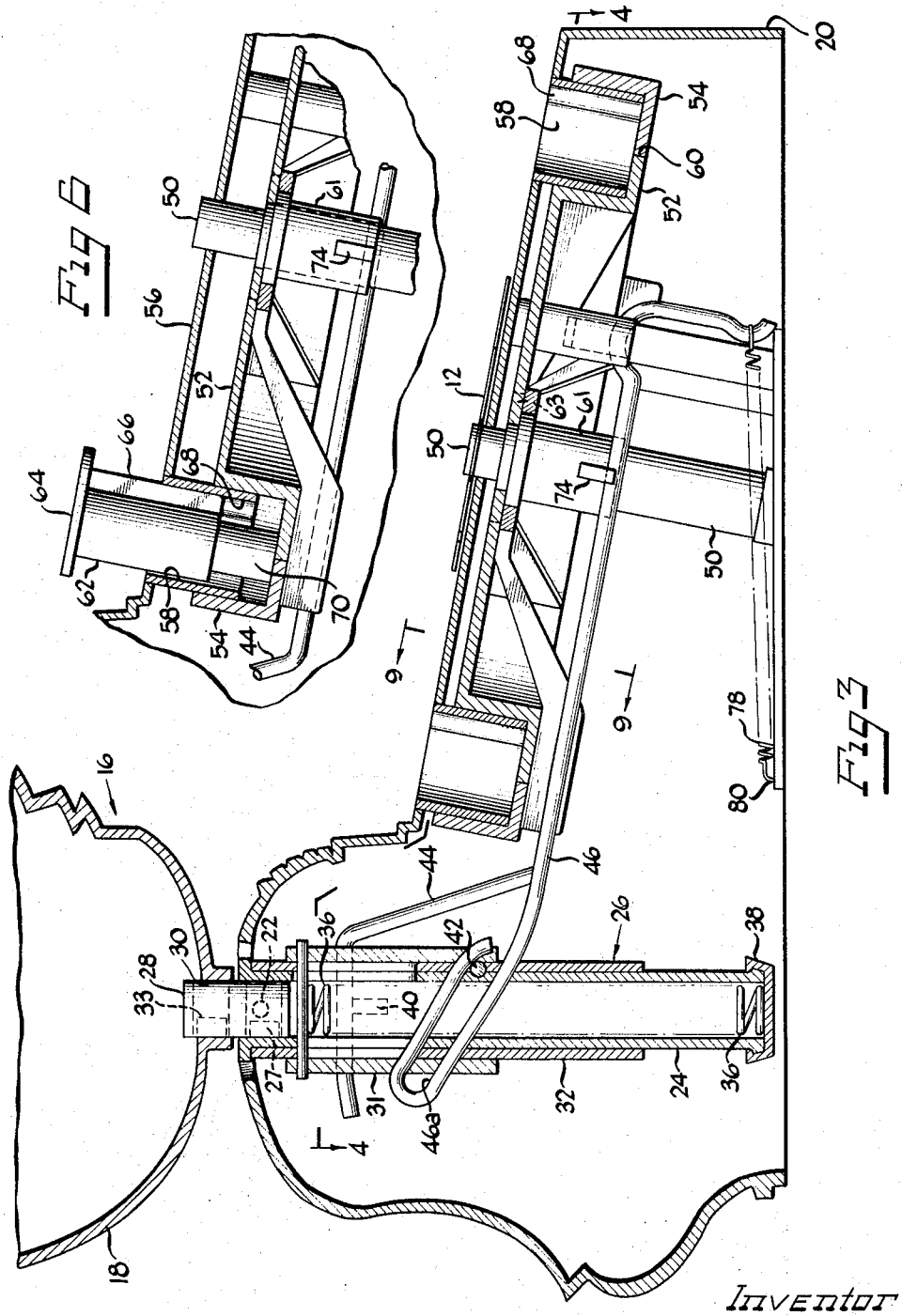

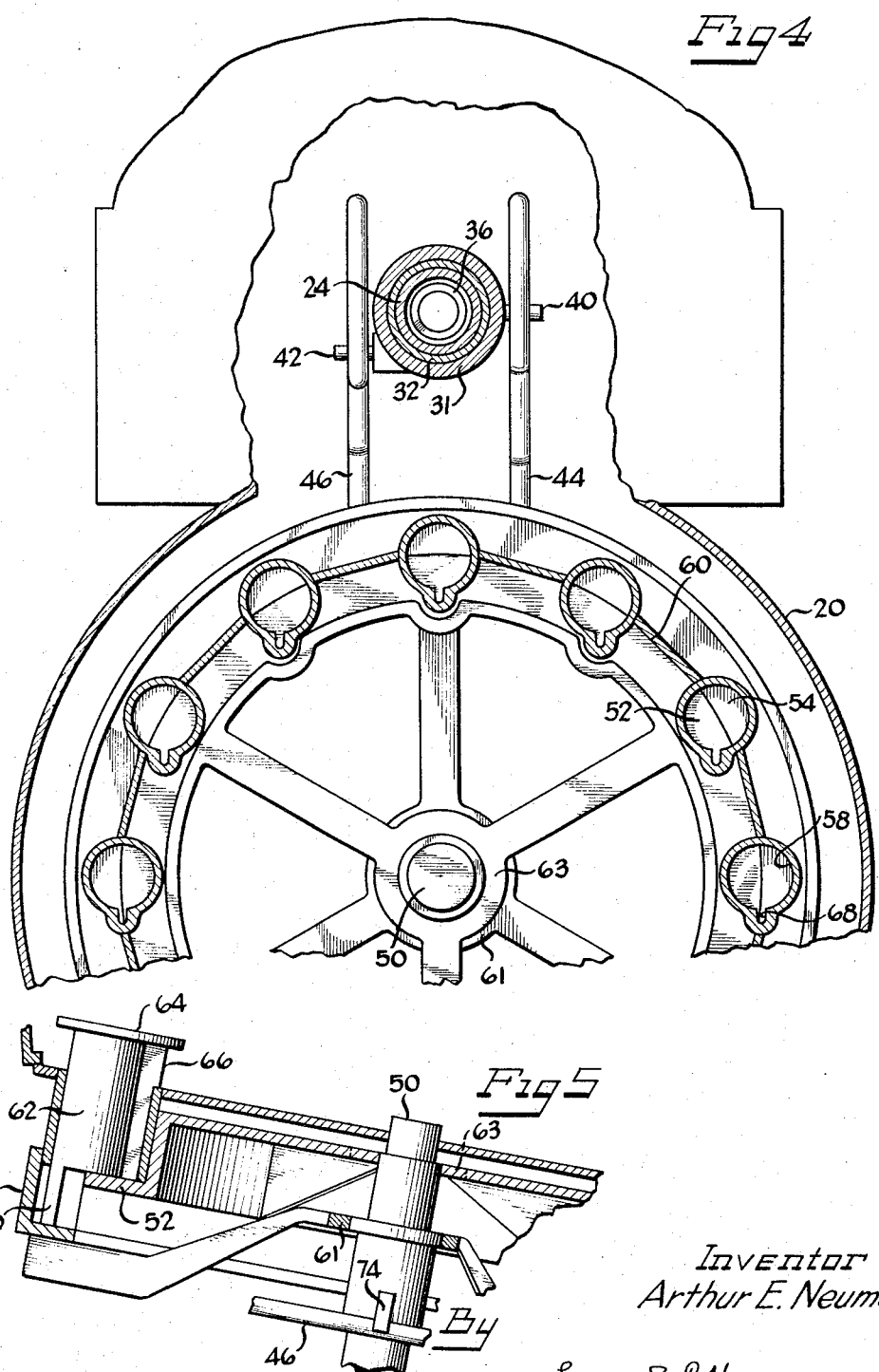

Jan. 9, 1968   A. E. NEUMANN   3,362,103
ANIMATED TOY CLOCK
Filed June 1, 1965   4 Sheets-Sheet 4
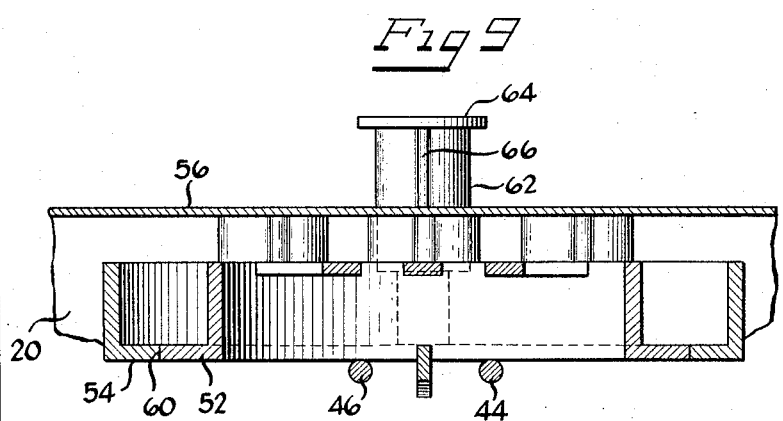
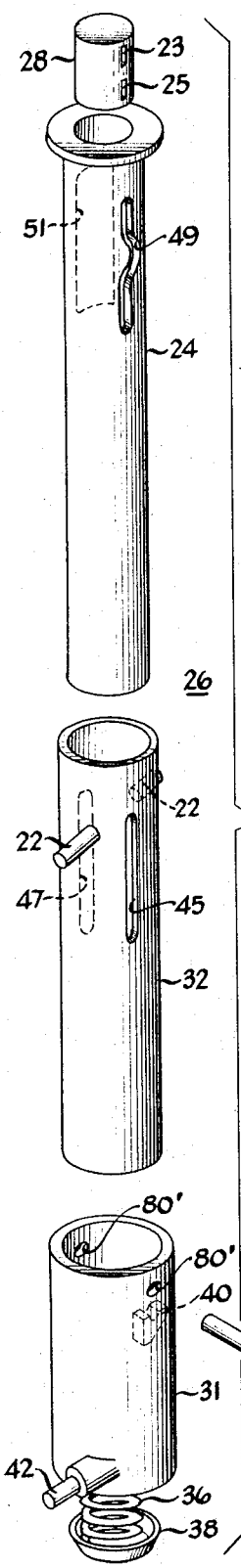
Inventor
Arthur E. Neumann
By
Lucas & Coffee
Attys United States Patent Office 3,362,103
Patented Jan. 9, 1968

3,362,103
ANIMATED TOY CLOCK
Arthur E. Neumann, Winnetka, Ill., assignor to Marvin Glass & Associates, Chicago, Ill., a partnership
Filed June 1, 1965, Ser. No. 460,372
3 Claims. (Cl. 46—116)

ABSTRACT OF THE DISCLOSURE

A toy clock comprising a frame structure including means defining a clock face having a plurality of openings and number elements adapted to be inserted in the openings. Also mounted on the frame structure is a figure having a movable head portion, with such head portion being connected to mechanism underlying the face of the clock. As the number elements are inserted in the openings in the clock face, the figure head portion nods "affirmatively" or "negatively" to indicate whether the number has been correctly positioned on the clock face.

The present invention relates generally to toys and is particularly directed to an educational type of toy.

Educational toys have been popular for a long period of time and are generally of great benefit, particularly to children of pre-school age. Usually the educational type of toy has involved the problem of proper placement of pieces, with the toy being so designed that it is impossible to improperly place any piece in the assembly. The child recognizes success when each piece is completely received by a complementary opening, or when a number of pieces are fitted together to complete a design or picture. Such toys are commendable, but it is believed that they lack something in the amount of satisfaction offered to the child and, consequently, the child very often loses interest in the toy rather quickly. The present invention is particularly concerned with the provision of an educational type toy, which is accompanied by a positive and amusing means of indicating to the child that he has successfully fulfilled at least part of his mission.

It is, therefore, the primary object of this invention to provide a novel form of educational toy. A further object of the invention is to provide an educational type of toy requiring proper placement of pieces, wherein such proper placement is definitely indicated by a movable portion of the toy. Still another object of the invention is to provide a toy including a plurality of openings and a corresponding number of removable elements which are adapted to be inserted in any of the openings but are intended to be placed in a predetermined sequence, and having means engageable by each element as it is inserted in an opening which is operable to indicate whether such element is properly or improperly placed in the opening.

A more detailed object of the invention is to provide a toy having a clock face and removable numbers for such face, and including a figure having a head which is operable to indicate approval by nodding in an affirmative manner when a number is properly positioned and to indicate disapproval when the number is improperly positioned in an opening in the clock face. Further objects and advantages will become apparent from the following description of the selected embodiment of the invention illustrated in the drawings, wherein:

FIGURE 1 is a perspective view of the toy clock embodiment;

FIGURE 2 is an enlarged, elevational view, partly in section, with the section being taken along the line 2—2 in FIGURE 1;

FIGURE 3 is a longitudinal sectional view taken generally along the line 3—3 in FIGURE 1;

FIGURE 4 is a fragmentary, sectional view taken generally along the line 4—4 in FIGURE 3, with parts broken away;

FIGURE 5 is a fragmentary view of the structure in FIGURE 3, with a portion of such structure having been moved by proper insertion of one of the elements in the clock face;

FIGURE 6 is a fragmentary view, similar to FIGURE 5, but illustrating the movement of parts when an element is improperly positioned in one of the openings in the clock face;

FIGURE 7 is a perspective view of one of the removable numbers for the clock;

FIGURE 8 is an exploded view of the assembly supporting the figure on the clock; and FIGURE 9 is a sectional view taken generally along the line 9—9 in FIGURE 3.

With reference particularly to FIGURES 1–3, it will be seen that the selected embodiment of the invention comprises generally a toy clock 10 having a face including movable hands 12 and removable numbers 14 adjacent the periphery of the clock face. The toy also includes a figure 16 adjacent the clock face and having a movable head portion 18. As the child inserts one of the removable numbers 14 in the clock face, the head 18 of the figure nods in the affirmative, if the number is properly placed in its conventional position around the clock, but if the number is improperly positioned the head will turn from side to side to indicate "No." Thus, the child is provided with a "teacher" which functions automatically to approve or disapprove each move and serves to provide continuing amusement for the child.

With particular reference to FIGURE 3, it will be seen that the toy clock comprises generally a base frame structure 20, which may be of molded plastic or the like, and which is adapted to be placed on a flat supporting surface. A major portion of the upper surface of the frame structure is generally circular in the form of a clock and is inclined for better viewing by the child. Adjacent the upper end of the inclined clock surface is the toy figure 16, with the body of the figure being preferably molded as a portion of the frame 20, and the head 18 is movably supported on the body for movement relative thereto about a pair of transverse pivots defined generally by a pair of pins 22 and by an elongated tube 24 extending downwardly into the body.

As seen also in FIGURE 8, the support for the head comprises a generally tubular assembly 26 including a plastic piece 28 which is fitted within an opening 30 (FIG. 3) in the neck portion of the figure and keyed to the head 18 by engagement of a slot 23 with a rib 33 formed in the lower end of the head. Similarly, a lower slot 25 in piece 28 is keyed to a rib 27 molded in the upper part of tube 24. The upper end of the elongated tubular part 24 extends downwardly substantially the entire depth of the body. A pair of relatively slidable and rotatable, tubular members or sleeves 31 and 32 are disposed in concentric relation to the main supporting tube 24. The outer sleeve 31 has inserted therethrough a pin 34 which is disposed just below the flexible head supporting part 28, and an elongated coil spring 36 is interposed between the pin and a cap 38 forming the bottom of the main supporting tube 24. The outer sleeve 31 has formed thereon a rib or boss 40 projecting from one side of the sleeve, and the lower opposite side of the sleeve 31 carries a projecting stud or pin 42. The rib 40 and the pin 42 provide means for engagement by a pair of actuating rods 44 and 46 so as to effect movement of the head 18. The inner sleeve 32 has at its upper end a pair of axially aligned projecting pins 22, which are journalled in cylindrical bosses (not shown) formed within the body of the figure adjacent the neck, and pins 22 provide a horizontal pivot axis for movement of the head 18 and assembly 26.

As noted particularly in FIGURES 3 and 8, the pin 34 extends through a pair of elongated, slotted openings 45 and 47 in sleeve 32 and through a pair of slots 49 and 51 in inner sleeve 24, slot 49 is of curved configuration, so that vertical movement of sleeve 31 is accompanied by rotational movement of the tube 24 about its longitudinal axis to provide an accompanying rotating movement of the head 16 first to one side and then to the other of its normal position facing the clock so as to signify "No," and slot 51 is generally rectangular and sufficiently wide to permit the described movement. It will also be noted that the entire head and supporting assembly 26 can be rocked about the axis of pin 22, in a manner to be described, so as to tip forward about the generally horizontal axis of pin 22 and then return to its normally erect position to signify "Yes."

The clock face portion of the toy includes a central spindle or post 50 which supports the movable hands 12 at its upper end. This post 50 also carries a pair of concentrically arranged and generally circular parts 52 and 54 which are disposed beneath the upper surface 56 of the clock for movement axially of the post 50. The peripheral adjoining portions of these movable parts 52 and 54 are disposed in abutting relation and cooperate to define the bottom of the openings 58 which receive the removable numbers 14. As noted in FIGURE 4, the peripheral portions are fitted together in abutting relation along a line or edge 60 which defines a circle about the axis of the supporting post. Each of the movable parts 54 and 52 is slidably supported on the post 50, by cylindrical, axial portions 61 and 63, respectively, and normally maintained in an upper position by a coil spring 78 interposed between the forward end of rod 46 and a fastener on the base, such as opening 80. More particularly, the cylindrical part 61 of the outer ring 54 includes a projecting rib 74 which overlies and engages an intermediate portion of rod 46. The opposite face of part 61 includes a vertical slot which receives a rib 75 extending outwardly from part 63 in overlying engagement with rod 44. Consequently, the outer ring 54 can move downwardly on post 50 and thereby move rod 46 downwardly, without disturbing inner ring 52, as seen in FIGURE 5, by virtue of slot 61 moving relative to rib 75. Such occurs when a number is properly positioned about the clock face. When a number is improperly positioned, the movement shown in FIGURE 6 occurs, with both of ribs 74 and 75 being moved downwardly along post 50 as the overlying ring 63 bears against upper end of cylinder 61.

The removable number elements 14 (FIGURE 7) comprise a generally cylindrical body part 62 having a disc 64 formed at the upper end with a number formed thereon, a spine or key 66 running lengthwise of the body part 62 and adapted to be received in a slot 68 formed along an edge of each of the openings 58 formed in the clock face, and an arcuately shaped lower end portion 70. The arcuately shaped lower end portion 70 of each removable piece 14 is definitely and differently related to the spine 66 on each piece, so that while each piece is insertable in any of the clock face openings 58, the arcuate portion 70 will be disposed for engagement with both of the movable parts 52 and 54 in all of the openings but one. When placed in its proper position around the clock face, the removable number part 14 will have its arcuate lower end portion 70 disposed entirely in engagement with the outer movable part 54. Consequently, the complete downward movement of the numeral part 14 will cause the outer movable part 54 to be depressed relative to the inner movable part 52, as seen in FIGURE 5. This downward movement will cause the outer movable part 54 to engage the actuating rod 46 which, in turn, will result in an affirmative nodding of the head 18. More particularly, as the rod 46 is moved downwardly the looped camming surface 46a which engages pin 42 causes the latter to be urged rearwardly of the clock. Such movement, of course, causes the assembly 26 and the head 18 attached thereto to pivot about pin 22 and cause the head 18 to nod in an affirmative manner.

When a numeral 14 is improperly positioned, the lower arcuate portion 70 thereof engages both movable parts 52 and 54 and depresses them together and into engagement with the other actuating rod 44 to provide the negative nodding of the head previously described. While both rods 44 and 46 are depressed in the latter instance, the action of rod 44 will predominate and move rib 40 downwardly to effect a negative nodding of head 18 while pin 42 moves downwardly along with loop 46a.

As noted particularly in FIGURES 3 and 8, the actuating rods 44 and 46 extend rearwardly into engagement with rib 40 and pin 42, respectively, which extend from opposite sides of sleeve 31. Sleeve 31 is the outermost of the three telescoping members comprising the support for head 18, with sleeve 32 being disposed within sleeve 31, and tube 24 being received within sleeve 32. The entire assembly is pivotally supported on the body of the figure by the aligned pivot pins 22 which project outwardly from opposite sides of sleeve 32 and are journaled in suitable bearing means, such as bosses formed in the interior wall of the body figure. Further, the telescoping elements of the assembly are yieldably held in position against axial movement by means of the pin 34 and spring 36. Pin 34 extends through aligned circular openings 80' in sleeve 31, slots 45 and 47 in sleeve 32, and cam slots 49, 51 in tube 24. The spring 36 bears against pin 34 to normally maintain the latter in the upper end of the slots in sleeve 32 and tube 24, but downward movement of the outer sleeve 31, as through rod 44 pushing down on rib 40, carries the pin 34 downwardly in cam slots 49, 51 to effect an oscillating motion of the inner tube 24 and the head 18 supported thereon.

Thus it is seen that there is provided a novel and educational toy in the form of a clock having removable numbers for disposition about the circumference of the clock. In the event that a number is improperly positioned, the figure head nods "no" to indicate its approval, and if the number is properly positioned the figure head nods "yes" to indicate approval. Although shown and described with respect to particular structure it will be apparent that variations might be made without departing from the principles of this invention.

What is claimed is:

1. A toy comprising a frame structure, means on said frame defining a plurality of openings therein, a plurality of elements each including a different indicia thereon and adapted to be inserted in any of said openings, movable means carried by said frame at a position below said opening defining means in position for engagement by each of said elements when inserted in one of said openings, said movable means comprising a pair of complementary members each having a portion thereof underlying a portion of each of said openings, each of said elements having a lower end portion formed so that when inserted in one of said openings it will engage and move only one of said complementary movable members and when inserted in any of the other of said openings it will engage and move both of said movable members, a part mounted on said frame for relative movement in either of two different directions, and means connected with said part and positioned for engagement by said complementary members and operable in response to movement of said one member only to cause said movable part to move in one direction and also being operable in response to simultaneous movement of said complementary members to cause said movable part to move in another direction.

2. A toy clock comprising a frame structure, means on said frame defining a clock face including a plurality of openings therein, a plurality of clock number elements each including a different number thereon and adapted to be inserted in any of said openings, movable means carried by said frame at a position below said opening defining means in position for engagement by each of said elements when inserted in one of said openings, said movable means comprising a pair of generally circular complementary members each having a peripheral edge portion thereof underlying a portion of each of said openings, each of said number elements having a lower end portion formed so that when inserted in the proper one of said openings on the clock face it will engage and move only one of said complementary movable members and when inserted in any of the other of said openings it will engage and move both of said movable members, a part mounted on said frame for relative movement in either of two different directions, and means connected with said movable part and with each of said complementary members and operable in response to movement of said one complementary member to cause said movable part to move in one direction and also being operable in response to simultaneous movement of both of said complementary members to cause said movable part to move in another direction.

3. A toy clock comprising a frame structure, means on said frame defining a clock face including a plurality of openings therein, a plurality of generally cylindrical clock-number elements having a rib extending lengthwise of the edge thereof, with each number element including a different number thereon and adapted to be inserted in any of said openings with the rib portion engaging a keyway in the frame, movable means carried by said frame at a position below said opening defining means in position for engagement by each of said elements when inserted in one of said openings, said movable means comprising a pair of generally circular complementary members each having a peripheral edge portion thereof underlying a portion of each of said openings, each of said number elements having an arcuately shaped lower end portion disposed so that when guidedly inserted in one of said openings through engagement of its rib with the keyway in said one opening it will engage and move only one of said complementary movable members and when inserted in any of the other of said openings it will engage and move both of said movable members, a figure mounted on said frame with its head supported for relative movement in either of two different directions to indicate an affirmative and a negative response, respectively, and means connected with said figure head and with each of said complementary members and operable in response to movement of said one member to cause said head to move in one direction to indicate approval and also being operable in response to simultaneous movement of said complementary members to cause said head to move in another direction to indicate disapproval of the positioning of a clock-number element.

References Cited

UNITED STATES PATENTS

| | | | |
|---|---|---|---|
| 2,290,801 | 7/1942 | Dale | 46—245 XR |
| 2,539,077 | 1/1951 | Hawkins. | |
| 2,633,669 | 4/1953 | Churus | 46—247 |
| 3,252,230 | 5/1966 | Donev | 35—9 |

FOREIGN PATENTS 656,200   1/1963   Canada.

LOUIS G. MANCENE, *Primary Examiner.*

S. NATTER, *Assistant Examiner.*